United States Patent
Kaplan et al.

(10) Patent No.: US 9,147,248 B2
(45) Date of Patent: Sep. 29, 2015

(54) HARDWARE CALIBRATION OF EYE TRACKER

(71) Applicant: Tobii Technology AB, Danderyd (SE)

(72) Inventors: Anders Kaplan, Uppsala (SE); Gunnar Troili, Taby (SE); John Elvesjo, Stockholm (SE)

(73) Assignee: TOBII TECHNOLOGY AB, Danderyd (SE)

( * ) Notice: Subject to any disclaimer, the term of this patent is extended or adjusted under 35 U.S.C. 154(b) by 157 days.

(21) Appl. No.: 13/723,647

(22) Filed: Dec. 21, 2012

(65) Prior Publication Data

US 2014/0180619 A1 Jun. 26, 2014

(51) Int. Cl.
*G06T 7/00* (2006.01)

(52) U.S. Cl.
CPC ............ *G06T 7/0018* (2013.01); *G06T 7/0042* (2013.01)

(58) Field of Classification Search
CPC .................................................. G06T 7/0018
USPC .............................. 702/94; 345/156–158, 178
See application file for complete search history.

(56) References Cited

U.S. PATENT DOCUMENTS

| | | | | |
|---|---|---|---|---|
| 5,751,260 | A * | 5/1998 | Nappi et al. | 345/8 |
| 6,943,754 | B2 * | 9/2005 | Aughey et al. | 345/8 |
| 2006/0214911 | A1 * | 9/2006 | Miller | 345/157 |

FOREIGN PATENT DOCUMENTS

WO    WO 01/33988    *    5/2001    ............... A43D 1/02

OTHER PUBLICATIONS

Dan Witzner Hansen et al., "In the Eye of the Beholder: A Survey of Models for Eyes and Gaze", IEEE Transactions on Pattern Analysis and Machine Intelligence, vol. 32, No. 3, Mar. 2010, pp. 478-500.*
"How to set up Tobii x50"; Tobii Technology AB, 2005, pp. 1-8.

* cited by examiner

*Primary Examiner* — Alexander Satanovsky
(74) *Attorney, Agent, or Firm* — Moore & Van Allen PLLC; W. Kevin Ransom

(57) ABSTRACT

A gaze tracking device is calibrated to a display unit by presenting graphical guide objects on an active area thereof, which designate distinctive features reflecting how the device may be positioned n a first side of a frame of the display unit. User commands move the objects on the display's active area in a first direction parallel to the first side of the frame. A position value designating an actual position for the gaze tracking device on the first side of the frame is assigned based on a current position of the graphical guide objects on the active area. An offset value is calculated based on the assigned position value and a known measure of the active area. The offset value represents a distance in the first direction between a well-defined point of the gaze tracking device and a well-defined point of the first side. Width and height measures reflecting a physical extension of the active area are also determined and stored in response to a user input confirmation command together with the offset value, so that the values can be used when determining a user's gaze point on the active area.

13 Claims, 2 Drawing Sheets

HARDWARE CALIBRATION OF EYE TRACKER

THE BACKGROUND OF THE INVENTION AND PRIOR ART

The present invention relates generally to solutions for hardware configuring a given eye and/or gaze tracker for an arbitrary display unit. More particularly the invention relates to a data processing unit according to the preamble of claim 1 and a method according to the preamble of claim 7. The invention also relates to a computer program product according to claim 13 and a computer readable medium according to claim 14.

Up until now, devices for tracking a user's eyes and/or determining user's a gaze position on a computer screen have been relatively uncommon, at least in the domain of ordinary computer users. So far, the majority of the users have been scientists or individuals with disabilities, i.e. people who either are willing to invest a substantial amount of own work in setting up this type of computer interface, or people who are assisted by professional staff having special training for this task. Therefore, comparatively complicated setup and hardware calibration procedures for associating a peripheral eye and/or gaze tracking device to an existing screen have been acceptable.

Problems Associated with the Prior Art

However, if an ordinary computer user shall be able to upgrade his/her computer display unit with a gaze tracking device, the setup and hardware calibration process must be substantially simplified. Otherwise, this type of eye/gaze tracking technology will never reach the mass market.

SUMMARY OF THE INVENTION

The object of the present invention is to solve the above problem, and thus offer an uncomplicated and intuitive solution for hardware calibrating a gaze tracking device to a display unit.

According to one aspect of the invention, the object is achieved by the initially described data processing unit, wherein this unit includes a data output interface and a user input interface. The data output interface is configured to produce control data for presenting at least one graphical guide object on an active area of the display unit. The at least one graphical guide object designates at least one distinctive feature of the gaze tracking device, which reflects how the gaze tracking device may be positioned on a first side of a frame of the display unit. The user input interface is configured to receive at least one user input movement command and a user input confirmation command. The data processing unit is configured to produce the control data, such that at least one of the at least one graphical guide object moves on the active area in a first direction parallel to the first side of the frame in response to the at least one user input movement command. The data processing unit is configured to assign a position value designating an actual position for the gaze tracking device on the first side of the frame based on a current position of the at least one graphical guide object on the active area. Further, the data processing unit is configured to calculate an offset value based on the assigned position value and a known measure of the active area (such as a pixel size or a display width/height together with a resolution figure). The offset value here represents a distance in the first direction between a well-defined point of the gaze tracking device and a well-defined point of the first side of the display unit, say the midpoint thereof. The data processing unit is also configured to determine a width measure and a height measure reflecting a physical extension of the active area of the display unit; and in response to a user input confirmation command, store the offset value, the width measure and the height measure for use as references when determining a user's gaze point on the active area.

This data processing unit is advantageous because it provides a straightforward and very user-friendly means to obtain a reliable and accurate hardware calibration of an eye tracking device to any type of display unit.

According to one preferred embodiment of this aspect of the invention, the data processing unit includes a data input interface configured to receive, from a data storage in communicative connection with the data processing unit: a resolution parameter, a value reflecting the size of each pixel of the active area the width measure and/or the height measure of the active area. Thus, this data may be stored in an internal memory, a database, or in a corresponding external resource accessible via a network, e.g. the Internet.

According to another preferred embodiment of this aspect of the invention, the at least one graphical guide object designates at least two distinctive features, which indicate a physical extension of a part of the gaze tracking device (e.g. the entire length of the device) along the first side of the display unit. The at least one user input movement command here includes at least one command to adjust a position of at least one of the at least one graphical guide object to the physical extension of said part along the first side (i.e. so that the positions for the graphical guide objects match a positioning of the gaze tracking device). Thus, for example an on-screen image of the gaze tracking device can be zoomed in/out, or by other means be transformed, to match the width and positioning of the actual gaze tracking device. Naturally, for most users, this is a very simple and intuitive means of interacting with the proposed calibration system.

Preferably, if the width measure of the active area is not known beforehand, the data processing unit is further configured to calculate the width measure based on the resolution parameter and a distance measure derived from a respective position of two of said graphical guide objects on the active area. Namely, the physical extension of said part of the gaze tracking device along the first side is known, and may therefore be used as a ruler to measure a distance on the active area. On the further basis of this distance and the resolution parameter, the entire width of the active area can be determined in a very straightforward manner.

According to still another preferred embodiment of this aspect of the invention, the resolution parameter is presumed to contain data reflecting an aspect ratio of the active area. Moreover, assuming that the pixels of the active area are quadratic, the data processing unit is configured to calculate the height measure of the active area based on the width measure and the resolution parameter. Hence, the two-dimensional physical extension of the active area is known with high accuracy.

According to another aspect of the invention, the object is achieved by the method described initially, wherein at least one graphical guide object is presented on an active area of the display unit. The at least one graphical guide object designates at least one distinctive feature of the gaze tracking device reflecting how the gaze tracking device may be positioned on a first side of a frame of the display unit. At least one of the at least one graphical guide object is moved on the active area in a first direction parallel to the first side of the frame in response to at least one user input movement command. A position value designating an actual position for the gaze tracking device on one first side of the frame is assigned based on a current position of the at least one graphical guide object on the active area. An offset value is calculated based on the assigned position value and a known measure of the active area (e.g. as a pixel size or a display width/height plus a resolution figure). The offset value represents a distance in the first direction between a well-defined point of the gaze tracking device and a well-defined point of the first side of the display unit. Width and height measures are determined, which reflect a physical extension of the active area. In response to a user input confirmation command, the offset value, the width measure and the height measure are stored for use as references when determining a user's gaze point on the active area. The advantages of this method, as well as the preferred embodiments thereof, are apparent from the discussion above with reference to the proposed apparatus.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
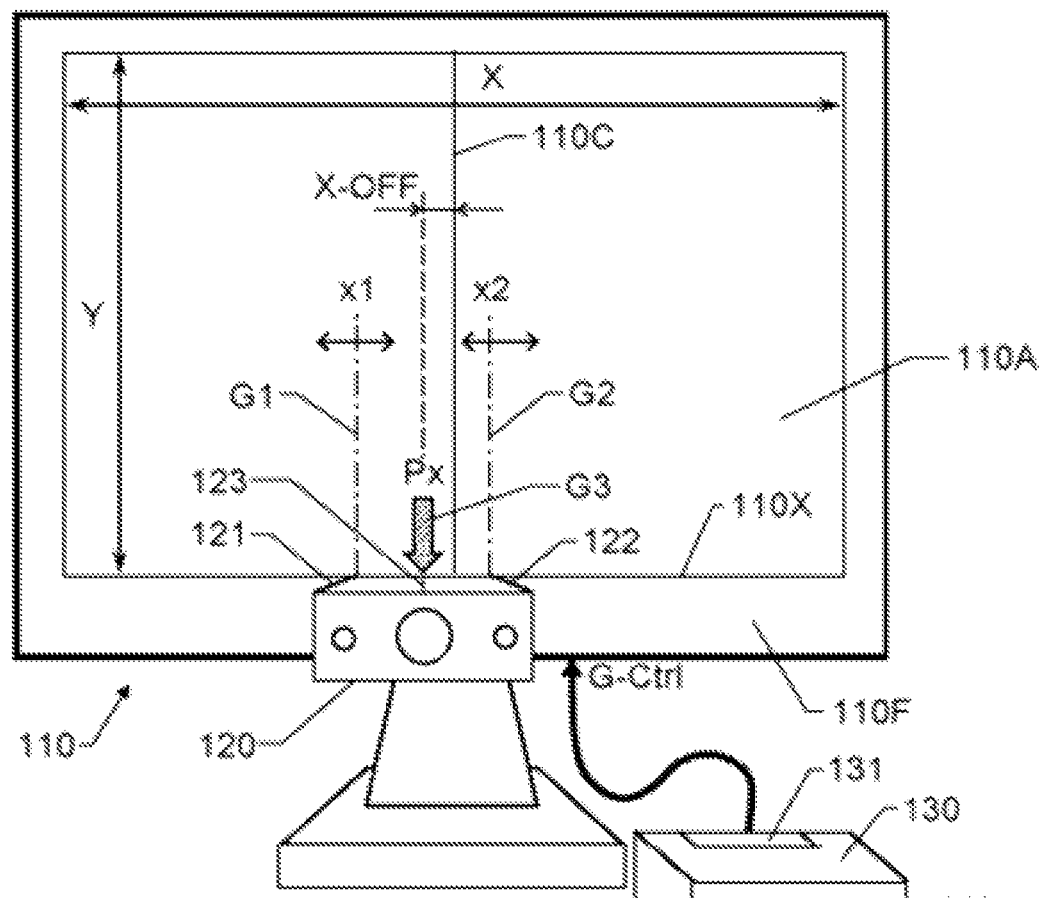
FIG. 1 shows a first view of a display unit onto which a gaze tracking device is mounted according to one embodiment of the invention.
Figure 2:
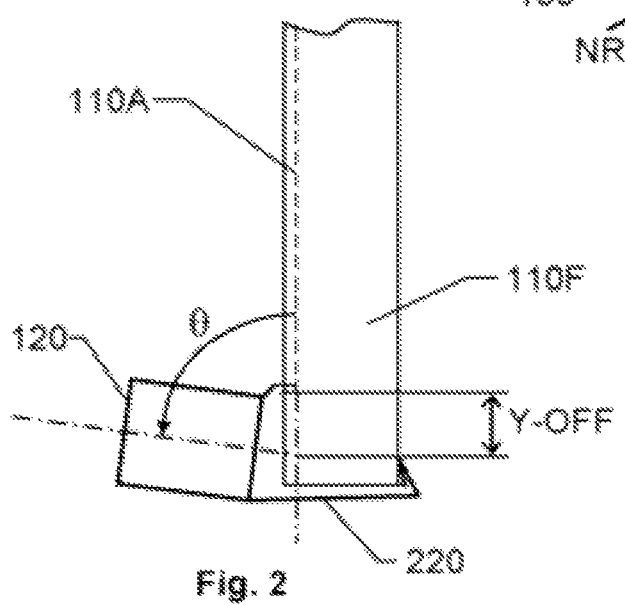
FIG. 2 shows a side view of how the gaze tracker device of FIG. 1 is attached to the display unit.

Initially, we refer to FIG. 1, which shows a first view of a display unit 110 onto which a gaze tracking device 120 is mounted according to one embodiment of the invention. FIG. 2 shows a side view of the gaze tracker device 120 in FIG. 1, illustrating how this device is attached to the display unit 110.

According to the invention, a data processing unit 130 is used to hardware calibrate the gaze tracking device 120 with respect to a particular display unit 110. The invention presumes that the gaze tracking device 120 has already been attached to a frame 110F of the display unit 110 when the proposed procedure is initiated. Typically, it is a good idea to mount the gaze tracking device 120 at an approximate midpoint on one of the sides of the frame 110F, say a lower side thereof. However, technically, it is possible to arrange the gaze tracking device 120 at any alternative position on or near the display unit 110 provided that the gaze tracking device 120 remains fixed at this position. Depending on the angular range of operation for the gaze tracking device 120 and the expected distance to a user of the display unit 110, a highly off-center positioning of the gaze tracking device 120 may cause difficulties, or even render it impossible to determine a user's gaze position on an active area 110A of the display unit 110.

The gaze tracking device 120 is associated with an attachment member 220 (e.g. including snap-on connectors, clamps or even tape) configured to secure the gaze tracking device 120 to the frame 110F at a fixed position. The attachment member 220 also has such a configuration that it ensures a fixed position relationship X-OFF, Y-OFF and angular θ relationship between the gaze tracking device 120 and the active area 110A. Hence, once the gaze tracking device 120 has been attached to the frame 110F, it can be assumed that its relative position X-OFF, Y-OFF and angle θ to the active area 110A remains constant. Furthermore, the angle θ to the active area 110A and an offset distance Y-OFF thereto are presumed to be known and given by the design of the attachment member 220.

The data processing unit 130 contains a data output interface 131 and a user input interface 132.

The data output interface 131 is configured to produce control data G-Ctrl for presenting at least one graphical guide object G1, G2 and/or G3 on the active area 110A of the display unit 110. The graphical guide objects G1, G2 and/or G3 designate a respective distinctive feature of the gaze tracking device 120, which reflect how the gaze tracking device 120 may be positioned on a first side 110X of the frame 110F of the display unit 110. For example, a first distinctive feature 121 may be represented by a left side edge 121 of the gaze tracking device 120 and a second distinctive feature 122 may be represented by a right side edge 122 of the gaze tracking device 120. Alternatively, or as a complement thereto, a third distinctive feature 123 may be given by any other well-defined point of the gaze tracking device 120, such as a marking on a side of the gaze tracking device 120, which marking, in turn, may indicate a midpoint of the gaze tracking device 120.

The user input interface 132 is configured to receive at least one user input movement command MC and a user input confirmation command CC, for instance generated by means of a keyboard, a mouse and/or a speech recognition interface. Here, the user input movement commands MC control a positioning x1 and x2 of the graphical guide objects G1 and G2 respectively on the active area 110A. The proposed procedure is essentially as follows. At least one graphical guide object G1, G2 and/or G3 is presented on the active area 110A. For example, first and second graphical guide objects G1 and G2 may be given by a respective line ending at a side of the active area 110A adjoining the first side 110X of the frame 110F of the display unit 110 where the gaze tracking device 120 is mounted. Then, via the user input movement commands MC, the user controls the respective position x1 and/or x2 for the graphical guide objects G1 and/or G2 until these positions match the first and second distinctive features 121 and 122 respectively. Analogously, the user may control a third graphical guide object G3, say in the form of an arrow, to match the third distinctive feature 123, such that the third graphical guide object G3 attains a position Px on the side 110X of the active area 110A.

When the graphical guide objects G1, G2 and/or G3 have been controlled to the desired positions (i.e. matching relevant distinctive features 121, 122 and/or 123 respectively), the user confirms these positions by entering a respective user input confirmation command CC via the user input interface 132, for example by using a keyboard, a mouse and/or uttering a voice command. As a result, a set of values are stored, which can be used as references when determining a user's gaze point on the active area 110A.

To enable this, the data processing unit 130 is configured to produce the control data G-Ctrl such that the graphical guide objects G1, G2 and/or G3 move on the active area 110A in a first direction parallel to the first side 110X of the frame 110F (i.e. left/right in the example shown in FIG. 1) in response to the user input movement commands MC. The data processing unit 130 is further configured to assign a position value, here symbolized Px, designating an actual position for the gaze tracking device 120 on the first side 110X of the frame 110F based on a current position of the graphical guide objects G1, G2 and/or G3 on the active area 110A.

Since the physical measures of the gaze tracking device 120 can be known in advance, it is presumed that values representing these measures are stored in, or by other means are accessible by the data processing unit 130. Moreover, the data processing unit 130 is configured to calculate an offset value X-OFF representing a distance in the first direction between a well-defined point of the gaze tracking device 120 and a well-defined point 110C of the first side 110X (e.g. the midpoint of the first side 110X). Preferably, to facilitate the procedure, the well-defined point of the gaze tracking device 120 is indicated by the distinctive feature 123. Alternatively, the well-defined point may be given by any other distinctive feature on the gaze tracking device 120, such as one of or two of its edges 121 or 122.

The offset value X-OFF is calculated based on the assigned position value Px and a known measure of the active area 110A. The known measure of the active area 110A may be given by a value reflecting the size of each pixel of the active area 110A. Alternatively, the known measure of the active area 110A may be represented by the width measure X of the active area 110A together with a resolution parameter NR for the display unit 110, or the height measure Y of the active area 110A together with a resolution parameter NR for the display unit 110.

Namely, the position value Px reflects a number of pixel columns between the well-defined point 110C and the distinctive feature 123; and said known measure provides a direct or indirect indication of the physical width of each pixel on the active area 110A. Thus, the data processing unit 130 can deduce the offset value X-OFF as physical distance (e.g. expressed in millimeters).

The data processing unit 130 is further configured to store the offset value X-OFF together with the width measure X and the height measure Y as references to use when determining a user's gaze point on the active area 110A. In other words, with knowledge of the offset value X-OFF, the gaze tracking device 120 can determine a user's gaze point on the active area 110A in a dimension parallel to the first direction. By knowing the width measure X, the gaze tracking device 120 can determine whether or not the gaze point is located on the active area 110A. Analogously, with knowledge of the offset value Y-OFF (given by the attachment member 220) in a direction perpendicular to the first direction, and by knowing the height measure Y, the gaze tracking device 120 can determine whether or not the gaze point is located on the active area 110A.

According to the invention, the offset value X-OFF may either be calculated repeatedly as different position values Px are assigned due to any variations in the position of the at least one graphical guide means G1, G2 and/or G3, or in connection with storing the offset value X-OFF, i.e. in response to a user input confirmation command CC (e.g. generated by hitting an enter key) and a current position of the at least one graphical guide object G1, G2 and/or G3 on the active area 110A.

According to one preferred embodiment of the invention, the graphical guide objects G1 and G2 designate two different distinctive features 121 and 122 respectively, which together indicate a physical extension of a part of the gaze tracking device 120 along the first side 110X, i.e. in the first direction. Said part of the gaze tracking device 120 may be represented by the entire length of the device 120, or any sub part thereof.

Here, the user input movement commands MC represent a first command for adjusting a position of the first graphical guide object G1 to match a position of the first distinctive feature 121 and a second command for adjusting a position of the second graphical guide object G2 to match a position of the second distinctive feature 122. The physical distance between the first and second distinctive features 121 and 122 along the first side 110X is presumed to be a value that is known to the data processing unit 130.

As mentioned above, the data processing unit 130 also has access to a known measure of the active area 110A. This measure, in turn, may be given by a value reflecting the size of each pixel of the active area 110A, a width measure X of the active area 110A together with a resolution parameter NR or a height measure Y of the active area 110A together with a resolution parameter NR. After that the user has confirmed that the positions of the graphical guide objects G1 and G2 match the positions of the distinctive features 121 and 122 respectively, by entering adequate input confirmation command(s) CC, it is further assumed that the data processing unit 130 knows the number of pixel columns between the first and second distinctive features 121 and 122.

Preferably, if the width measure X of the active area 110A is not known beforehand, the data processing unit 130 is further configured to calculate the width measure X based on the resolution parameter NR and a distance measure derived from a respective position x1 and x2 of two of the graphical guide objects G1 and G2 respectively on the active area 110A. Namely, as mentioned above, the physical extension of a part of the gaze tracking device 120 corresponding to the distance between the positions x1 and x2 along the first side is known. Therefore, this measure can be used as a ruler to measure a distance on the active area 110A. On the further basis of this distance and the resolution parameter NR, the entire width X of the active area 110A can be determined. The distance between the positions x1 and x2 along the first side may also be used as the known measure of the active area 110A when calculating the offset value X-OFF.

Provided that the resolution parameter NR contains data reflecting an aspect ratio of the active area 110A, the data processing unit 130 is further preferably configured to calculate the height measure Y based on the width measure X and the resolution parameter NR. In such a case the resolution parameter NR may be a so-called native resolution expressing a pair of values indicating a number of pixels in the first direction X and in a direction Y perpendicular thereto respectively, for example a 4:3 aspect ratio, such as: 640×480, 800×600, 1024×768, 1280×960 or 1600×1200, or an alternative aspect ratio such as 1280×1024.

Consequently, for a gaze position registered by the gaze tracking device 120, it is possible to deduce an XY-pixel coordinate on the active area 110A (provided, of course, that the gaze position is located within the active area 110A).

According to a preferred embodiment of the invention, the data processing unit 130 has a data input interface 133, which is configured to receive the resolution parameter NR from a data storage in communicative connection with the data processing unit 130. Hence, the resolution parameter NR can be retrieved internally from a computer in which the data processing unit 130 is included, or from an external database, e.g.

accessible via a network, such as the Internet. The width measure X and/or the height measure Y and/or a value reflecting the size of each pixel of the active area 110A may be received in the data processing unit 130 in a corresponding manner.

Preferably, the data processing device 130 contains, or is in communicative connection with a memory unit 140 storing a computer program product PP, which contains software for controlling the data processing unit 130 to perform the above-described actions when the computer program product PP is run on the data processing device 130.

Figure 3:
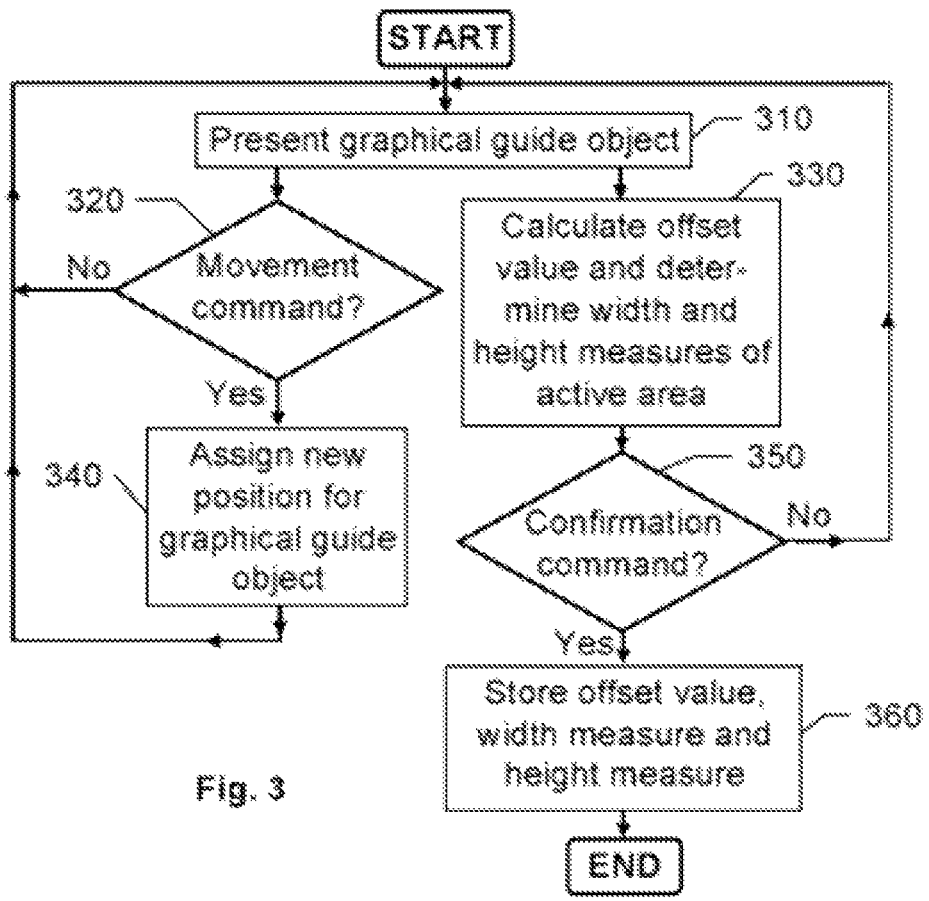
FIGS. 3-4 illustrate, by means of flow diagrams, the general method according to the invention.

In order to sum up, we will now describe the general method according to the invention with reference to the flow diagram in FIG. 3.

In a first step 310, at least one graphical guide object G1, G2 and/or G3 is presented on an active area 110A of the display unit 110 that is connected to a data processing unit 130, preferably the same unit which a gaze tracking device 120 mounted onto the display unit 110 is intended to control, or by other means is configured to interact with. The at least one graphical guide object G1, G2 and/or G3 designates one or more distinctive features of the gaze tracking device 120, which features, in turn, reflect how the gaze tracking device 120 may be positioned on a first side 110X of a frame 110F of the display unit 110.

Then, a step 320 checks if a user input movement command MC has been received, and if so, the procedure continues to step 340. Otherwise, the procedure loops back to step 310. In parallel with step 320, a step 330 calculates an offset value X-OFF representing a distance between a well-defined point of the eye tracking device 120 and a well-defined point 110C of the first side 110X of the active area 110A based on a current position of the at least one graphical guide object G1, G2 and/or G3 on the active area 110A. Naturally, as discussed above, this calculation requires that a physical measure of the active area 110A is known. Step 330 also determines width and height measures X and Y respectively of the active area 110A, either by reading out these values from a data storage, or by calculating them based on a measured distance x2-x1 and a resolution parameter NR.

As previously mentioned, these parameters may be used as the known measure of the active area 110A when calculating the offset value X-OFF.

Then follows a step 350, which checks if a user input confirmation command CC has been received, and if so, a step 360 follows.

Step 340 assigns a new position for one or more of the at least one guide objects G1, G2 and/or G3 in response to the user input movement command MC. Thereafter, the procedure loops back to step 310 for presenting the at least one guide objects G1, G2 and/or G3 at this/these new position(s).

Step 360 stores the offset value X-OFF and the width and height measures X and Y for use as a reference by the data processing device 130 when determining a user's gaze point on the active area 110A. After that, the procedure ends.

The position value Px may either be assigned in response to a user input confirmation command CC and a current position of the at least one graphical guide object G1, G2 and/or G3 on the active area 110A; or the position value Px may be assigned repeatedly as the positions of the at least one graphical guide objects G1, G2 and/or G3 vary over time.

Figure 4:
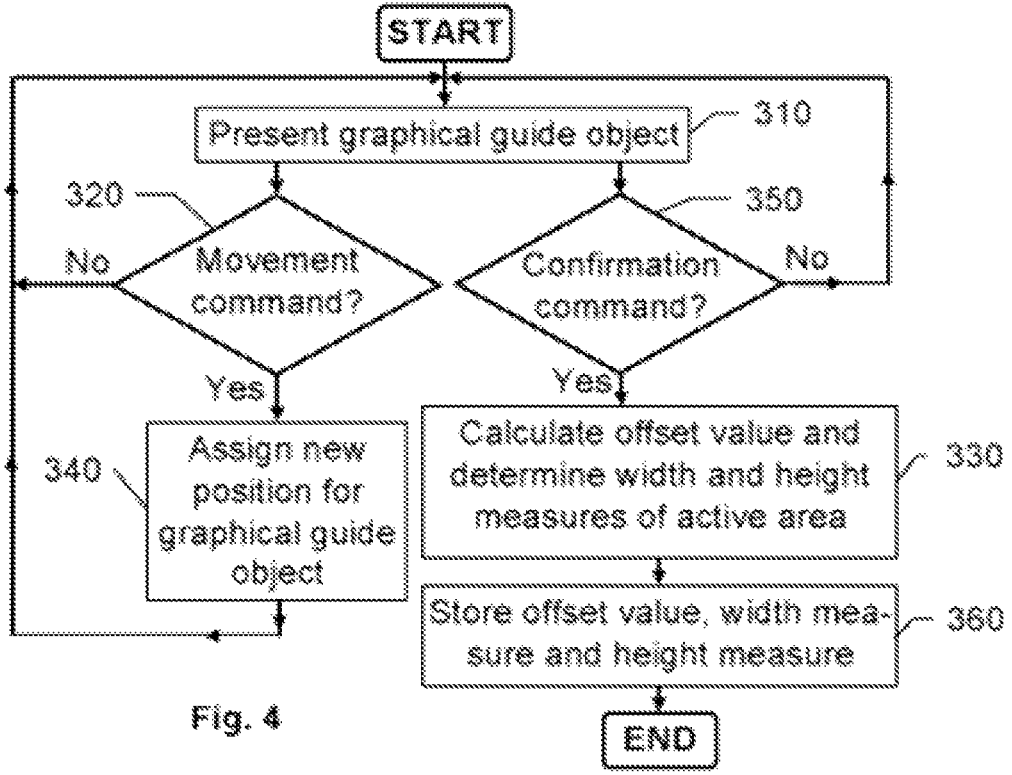

FIG. 4 contains another flow diagram, which also illustrates the general method according to the invention; however where the order is changed between calculation step 330 and step 350, which checks if a confirmation command has been received. The procedure described in FIG. 4 may be slightly preferable to that of FIG. 3, since in FIG. 4 the offset value X-OFF and the width and height measures X and Y are only calculated after that it has been confirmed that these values are actually to be stored for later use. Nevertheless, in FIG. 4, all blocks designate the same steps as those described above with reference to FIG. 3.

All of the process steps, as well as any sub-sequence of steps, described with reference to FIGS. 3 and 4 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A data processing unit configured to hardware calibrate a gaze tracking device with respect to a display unit by (i) determining the actual position at which the gaze tracking device is fixed with respect to the display unit during hardware calibration and at which position the gaze tracking device will remain fixed when determining a user's gaze point and (ii) determining the size of the active area on the display unit within which the gaze tracking device is to track a user's gaze point, wherein the data processing unit comprises:

a data output interface configured to produce control data for presenting at least one graphical guide object on an active area of the display unit, the at least one graphical guide object designating at least one distinctive feature of the gaze tracking device reflecting how the gaze tracking device may be positioned on a first side of a frame of the display unit, and a user input interface configured to receive at least one user input movement command and a user input confirmation command, and wherein the data processing unit is configured to:
produce the control data such that at least one of the at least one graphical guide object moves on the active area in a first direction parallel to the first side of the frame in response to the at least one user input movement command,
assign a position value designating an actual position for the gaze tracking device on the first side of the frame based on a current position of the at least one graphical guide object on the active area,
calculate an offset value based on the assigned position value and a known measure of the active area, the offset value representing a distance in the first direction between a well-defined point of the gaze tracking device and a well-defined point of the first side,
determine a width measure and a height measure reflecting a physical extension of the active area; and
store, in response to a user input confirmation command, the offset value, the width measure and the height measure for use when determining a user's gaze point on the active area.

2. The data processing unit according to claim 1, comprising a data input interface configured to receive a resolution parameter from a data storage in communicative connection with the data processing unit.

3. The data processing unit according to claim 1, comprising a data input interface configured to receive from a data storage in communicative connection with the data processing unit at least one of: a value reflecting the size of each pixel of the active area, the width measure and the height measure.

4. The data processing unit according to claim 1, wherein the at least one graphical guide object designates at least two distinctive features indicating a physical extension of a part of the gaze tracking device along the first side, and the at least one user input movement command comprises at least one command to adjust a position of at least one of the at least one graphical guide object to the physical extension said part along the first side.

5. The data processing unit according to claim 4, wherein the data processing unit is further configured to:
calculate the width measure based on the resolution parameter and a distance measure derived from a respective position of two of said graphical guide objects on the active area.

6. The data processing unit according to claim 5, wherein the resolution parameter comprises data reflecting an aspect ratio of the active area, and the data processing unit is further configured to:
calculate the height measure based on the width measure and the resolution parameter.

7. A method of hardware calibrating a gaze tracking device with respect to a display unit by (i) determining the actual position at which the gaze tracking device is fixed with respect to the display unit during hardware calibration and at which position the tracking device will remain fixed when determining a user's gaze point and (ii) determining the size of the active area on the display unit within which the gaze tracking device is to track a user's gaze point, the method comprising:
presenting at least one graphical guide object on an active area of the display unit, the at least one graphical guide object designating at least one distinctive feature of the gaze tracking device reflecting how the gaze tracking device may be positioned on a first side of a frame of the display unit;
moving, in response to at least one user input movement command, at least one of the at least one graphical guide object on the active area in a first direction parallel to the first side of the frame;
assigning, based on a current position of the at least one graphical guide object on the active area, a position value designating an actual position for the gaze tracking device on one first side of the frame;
calculating an offset value based on the assigned position value and a known measure of the active area, the offset value representing a distance in the first direction between a well-defined point of the gaze tracking device and a well-defined point of the first side;
determining a width measure and a height measure reflecting a physical extension of the active area; and
storing, in response to a user input confirmation command, the offset value, the width measure and the height measure for use when determining a user's gaze point on the active area.

8. The method according to claim 7, comprising receiving a resolution parameter via a data input interface.

9. The method according to claim 7, comprising receiving, via a data input interface, at least one of: a value reflecting the size of each pixel of the active area, the width measure and the height measure.

10. The method according to claim 7, wherein the at least one graphical guide object designates at least two distinctive features indicating a physical extension of a part of the gaze tracking device along the first side, and the method comprising:
receiving at least one user input movement command to adjust a position of at least one of the at least one graphical guide object to the physical extension of said part along the first side.

11. The method according to claim 10, further comprising:
calculating the width measure based on the resolution parameter and a distance measure derived from a respective current position of two of said graphical guide objects on the active area.

12. The method according to claim 11, wherein the resolution parameter comprises data reflecting an aspect ratio of the active area, and the method further comprises:
calculating the height measure based on the width measure and the resolution parameter.

13. A non-transitory computer readable medium, having a computer program recorded thereon, where the computer program comprises instructions for operation by a computing processor and for hardware calibrating a gaze tracking device with respect to a display unit by (i) determining the actual position at which the gaze tracking device is fixed with respect to the display unit during hardware calibration and at which position the gaze tracking device will remain fixed when determining a user's gaze point and (ii) determining the size of the active area on the display unit within which the gaze tracking device is to track a user's gaze point, said instructions comprising:
instructions for presenting at least one graphical guide object on an active area of the display unit, the at least one graphical guide object designating at least one distinctive feature of a gaze tracking device reflecting how the gaze tracking device may be positioned on a first side of a frame of the display unit;
instructions for moving, in response to at least one user input movement command, at least one of the at least one graphical guide object on the active area in a first direction parallel to the first side of the frame;

instructions for assigning, based on a current position of the at least one graphical guide object on the active area, a position value designating an actual position for the gaze tracking device on one first side of the frame;

instructions for calculating an offset value based on the assigned position value and a known measure of the active area, the offset value representing a distance in the first direction between a well-defined point of the gaze tracking device and a well-defined point of the first side;

instructions for determining a width measure and a height measure reflecting a physical extension of the active area; and instructions for storing, in response to a user input confirmation command, the offset value, the width measure and the height measure for use when determining a user's gaze point on the active area.

* * * * *